(12) United States Patent
Muse et al.

(10) Patent No.: US 11,964,422 B2
(45) Date of Patent: Apr. 23, 2024

(54) VALVE INCORPORATING TEMPORARY PHASE CHANGE MATERIAL

(71) Applicant: University of Florida Research Foundation, Inc., Gainesville, FL (US)

(72) Inventors: Joshua Muse, Gainesville, FL (US); Meghan Hughes, Gainesville, FL (US); Carl David Crane, Gainesville, FL (US); Thomas Ettor Angelini, Gainesville, FL (US); Kyle D. Schulze, Gainesville, FL (US); Tapomoy Bhattacharjee, Gainesville, FL (US); Wallace Gregory Sawyer, Gainesville, FL (US); Curtis Taylor, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 273 days.

(21) Appl. No.: 17/245,140

(22) Filed: Apr. 30, 2021

(65) Prior Publication Data
US 2021/0245420 A1 Aug. 12, 2021

Related U.S. Application Data

(63) Continuation of application No. 15/757,122, filed as application No. PCT/US2016/050175 on Sep. 2, 2016, now Pat. No. 11,027,483.
(Continued)

(51) Int. Cl.
*B29C 64/106* (2017.01)
*B29C 48/05* (2019.01)
(Continued)

(52) U.S. Cl.
CPC .......... *B29C 64/106* (2017.08); *B29C 48/501* (2019.02); *B29C 64/118* (2017.08);
(Continued)

(58) Field of Classification Search
None
See application file for complete search history.

(56) References Cited

U.S. PATENT DOCUMENTS

| 2,340,110 A | 1/1944 | D Alelio |
| 2,340,111 A | 1/1944 | D'Alelio et al. |

(Continued)

FOREIGN PATENT DOCUMENTS

| CA | 2822487 | 7/2012 |
| CN | 1450953 | 10/2003 |

(Continued)

OTHER PUBLICATIONS

Aldrich, S. (2019) "Thermal transitions of homopolymers: Glass transition & melting point."
(Continued)

*Primary Examiner* — Lore R Jarrett
(74) *Attorney, Agent, or Firm* — Thomas | Horstemeyer, LLP

(57) ABSTRACT

Described herein are various embodiments of a valve that may be opened and closed using a thixotropic or "stress yield" material, or other material that temporarily changes phase upon application of energy to the material. More particularly, some embodiments may include a valve that is opened and closed using a granular gel that is a temporary phase change material.

7 Claims, 5 Drawing Sheets

Related U.S. Application Data

(60) Provisional application No. 62/214,170, filed on Sep. 3, 2015.

(51) Int. Cl.
    *B29C 48/50*     (2019.01)
    *B29C 48/92*     (2019.01)
    *B29C 64/118*     (2017.01)
    *B29C 67/00*     (2017.01)
    *B33Y 10/00*     (2015.01)
    *B33Y 30/00*     (2015.01)
    *B33Y 70/00*     (2020.01)

(52) U.S. Cl.
    CPC .............. *B29C 67/00* (2013.01); *B33Y 10/00* (2014.12); *B33Y 30/00* (2014.12); *B29C 48/05* (2019.02); *B29C 48/92* (2019.02); *B29C 2948/92904* (2019.02); *B33Y 70/00* (2014.12)

(56) References Cited

U.S. PATENT DOCUMENTS

| | | | |
|---|---|---|---|
| 2,533,635 | A | 12/1950 | Seymour et al. |
| 3,940,351 | A | 2/1976 | Schlatzer, Jr. |
| 4,062,817 | A | 12/1977 | Westerman |
| 4,631,557 | A | 12/1986 | Cooke et al. |
| 5,034,486 | A | 7/1991 | Tzai et al. |
| 5,034,487 | A | 7/1991 | Tazi et al. |
| 5,034,488 | A | 7/1991 | Tazi et al. |
| 5,073,491 | A | 12/1991 | Familletti |
| 5,078,994 | A | 1/1992 | Nair et al. |
| 5,310,779 | A | 5/1994 | Lai |
| 5,349,030 | A | 9/1994 | Long, II et al. |
| 5,427,729 | A * | 6/1995 | Dubrow ............... G01N 30/56 264/211.18 |
| 5,470,900 | A | 11/1995 | Sasaki et al. |
| 5,654,362 | A | 8/1997 | Schulz, Jr. et al. |
| 5,697,441 | A | 12/1997 | Vercaemer et al. |
| 6,279,655 | B1 | 8/2001 | Pafitis et al. |
| 6,375,880 | B1 | 4/2002 | Cooper et al. |
| 6,476,147 | B1 | 11/2002 | Sullivan et al. |
| 6,486,901 | B1 | 11/2002 | DeBoer et al. |
| 6,936,212 | B1 | 8/2005 | Crawford |
| 6,942,830 | B2 | 9/2005 | Muelhaupt et al. |
| 7,049,346 | B1 | 5/2006 | Van Bladel et al. |
| 7,064,151 | B1 | 6/2006 | Berge et al. |
| 7,179,872 | B2 | 2/2007 | McCormick et al. |
| 7,285,237 | B2 | 10/2007 | Newell et al. |
| 7,799,371 | B2 | 9/2010 | Fork et al. |
| 8,133,341 | B2 | 3/2012 | Nealey et al. |
| 10,150,258 | B2 | 12/2018 | Feinberg et al. |
| 2004/0101518 | A1 | 5/2004 | Vacanti et al. |
| 2004/0120920 | A1 | 6/2004 | Lion et al. |
| 2004/0242837 | A1 | 12/2004 | Toyoda et al. |
| 2005/0247357 | A1 | 11/2005 | Welle |
| 2005/0253308 | A1 | 11/2005 | Sherwood |
| 2005/0282934 | A1 | 12/2005 | Brinkmann et al. |
| 2006/0136058 | A1 | 6/2006 | Pietrzak |
| 2006/0156978 | A1 | 7/2006 | Lipson et al. |
| 2006/0211790 | A1 | 9/2006 | Dimotakis et al. |
| 2007/0065538 | A1 | 3/2007 | Weatherall et al. |
| 2007/0255005 | A1 | 11/2007 | Masaoka |
| 2008/0262519 | A1 * | 10/2008 | Gurtner ............ A61B 17/00491 606/154 |
| 2009/0101271 | A1 | 4/2009 | Ishida |
| 2009/0171001 | A1 | 7/2009 | Lin et al. |
| 2010/0069522 | A1 | 3/2010 | Linhardt et al. |
| 2010/0102415 | A1 | 4/2010 | Millward et al. |
| 2010/0137534 | A1 | 6/2010 | Magnet et al. |
| 2010/0183977 | A1 | 7/2010 | Wang et al. |
| 2010/0184147 | A1 | 7/2010 | Cheng et al. |
| 2010/0304088 | A1 | 12/2010 | Steeman et al. |
| 2010/0321448 | A1 * | 12/2010 | Buestgens ............... B05B 7/066 347/68 |
| 2011/0064810 | A1 | 3/2011 | Ghanavi |
| 2011/0103174 | A1 * | 5/2011 | Jung ....................... B01F 33/403 422/537 |
| 2011/0256085 | A1 | 10/2011 | Talingting Pabalan et al. |
| 2012/0040013 | A1 | 2/2012 | Owens et al. |
| 2012/0045617 | A1 | 2/2012 | Yasukochi |
| 2012/0171258 | A1 | 7/2012 | Sefton et al. |
| 2013/0004385 | A1 | 1/2013 | Lee et al. |
| 2013/0029125 | A1 | 1/2013 | Tse et al. |
| 2013/0317131 | A1 | 11/2013 | Scales et al. |
| 2013/0333891 | A1 | 12/2013 | Fripp et al. |
| 2013/0344601 | A1 | 12/2013 | Soman et al. |
| 2014/0005178 | A1 | 2/2014 | Kumar et al. |
| 2014/0186952 | A1 | 7/2014 | Alsberg et al. |
| 2014/0224349 | A1 | 8/2014 | Ducrée et al. |
| 2014/0275317 | A1 | 9/2014 | Moussa |
| 2014/0295541 | A1 | 10/2014 | Nakanishi et al. |
| 2014/0037746 | A1 | 12/2014 | Trefonas, III et al. |
| 2015/0056317 | A1 | 2/2015 | Wu-Chieh |
| 2015/0057786 | A1 | 2/2015 | Murphy et al. |
| 2015/0091217 | A1 | 4/2015 | Araki |
| 2015/0093465 | A1 | 4/2015 | Page |
| 2015/0104639 | A1 | 4/2015 | Schroeyers et al. |
| 2015/0022558 | A1 | 8/2015 | Ohori et al. |
| 2015/0217024 | A1 | 8/2015 | Wang et al. |
| 2015/0031537 | A1 | 11/2015 | Mehta et al. |
| 2016/0062230 | A1 | 3/2016 | Wu et al. |
| 2016/0106663 | A1 | 4/2016 | Gulbin |
| 2016/0167312 | A1 | 6/2016 | Feinberg et al. |
| 2016/0019689 | A1 | 7/2016 | Ohori et al. |
| 2016/0215130 | A1 | 7/2016 | Esseghir et al. |

FOREIGN PATENT DOCUMENTS

| | | |
|---|---|---|
| CN | 102164661 | 8/2011 |
| CN | 203305668 U | 11/2013 |
| FR | 2583334 | 12/1986 |
| FR | 2634686 | 2/1990 |
| JP | S61-98547 | 5/1986 |
| JP | S6198547 | 5/1986 |
| JP | 2003533367 | 11/2003 |
| JP | 2009535467 | 10/2009 |
| JP | 4636770 | 12/2010 |
| JP | 5167496 | 1/2013 |
| JP | 2014207886 | 11/2014 |
| WO | 0178968 | 10/2001 |
| WO | 2006027702 | 3/2006 |
| WO | 2009139395 | 11/2009 |
| WO | 2012155110 | 11/2012 |
| WO | 2014024048 | 2/2014 |
| WO | 2014039825 | 3/2014 |
| WO | 2014049204 | 4/2014 |
| WO | 2014182885 | 11/2014 |
| WO | 2014205261 | 12/2014 |
| WO | 2014209994 | 12/2014 |
| WO | 2015017421 | 2/2015 |
| WO | 2015019212 | 2/2015 |
| WO | 2015107333 | 7/2015 |
| WO | 2015138566 | 9/2015 |
| WO | 2016044547 | 3/2016 |
| WO | 2018187595 | 10/2018 |
| WO | 2018187780 | 10/2018 |

OTHER PUBLICATIONS

Antoni, D.; et al (2015) "Three-Dimensional Cell Culture: a Breakthrough in Vivo." International journal of molecular sciences, 16(3), pp. 5517-5527.

Baudonnet, L., J-L.; et al. (2004) "Effect of Dispersion Stirring Speed on the Particle Size Distribution and Rheological Properties of Three Carbomers." Journal of dispersion science and technology 25.2 : 183-192.

Bayliss, K., et al. (2011) "Comparing Colloidal Phase Separation Induced by Linear Polymer and by Microgel Particles." Soft Matter 7.21 : 10345-10352.

Beck, Emily C., et al. (2015) "Enabling Surgical Placement of Hydrogels Through Achieving Paste-Like Rheological Behavior in

(56) References Cited

OTHER PUBLICATIONS

Hydrogel Precursor Solutions." Annals of biomedical engineering 43.10 : 2569-2576.
Bhattacharjee, Tapomoy, et al. (2016) "Liquid-Like Solids Support Cells in 3D." ACS Biomaterials Science & Engineering 2.10 : 1787-1795.
Chang, Ya-Wen, et al. (2015) "Biofilm Formation in Geometries with Different Surface Curvature and Oxygen Availability." New Journal of Physics 17.3 : 033017.
Chinese Office Action dated Feb. 15, 2019 for Chinese Patent Application 2015800755428.
Ellis, Perry W., et al. (2018) "Curvature-Induced Defect Unbinding and Dynamics in Active Nematic Toroids." Nature Physics 14.1 : 85-90.
European Search Report in Appln. No. 15865693.4 dated Jul. 18, 2018.
International Search Report for PCT/US2016/031385 dated Aug. 11, 2016.
International Search Report issued by U.S. for PCT/US2016/064771 dated Jan. 18, 2017.
International Search Report issued in European Patent Application PCT/US2016/017810 dated Jul. 12, 2016.
International Search Report dated Feb. 16, 2016 for PCT Patent Application PCT/US2015/064063.
International Search Report dated Dec. 30, 2016 for PCT Patent Application No. PCT/US2016/052102.
Jin, Yifei, et al. (2016) "Granular Gel Support-Enabled Extrusion of Three-Dimensional Alginate and Cellular Structures." Biofabrication 8.2 : 025016.
Khalil, et al. ( 2005) "Multi-nozzle deposition for construction of 3D biopolymer tissue scaffolds," Rapid Prototyping Journal,, vol. 11/1, pp. 9-17.
Anders, R, et al. Desktop manufacturing of complex objects, prototypes and biomedical scaffolds by means of computer-assisted design combined with computer-guided 3D plotting of polymers and reactive oligomers. Macromolecular Materials and Engineering 2000 282(1):17-21.
Liu, Guangyao,;et al (2012) "Development of Thermosensitive Copolymers of Poly (2-Methoxyethyl Acrylate-Co-Poly (Ethylene Glycol) Methyl Ether Acrylate) and their Nanogels Synthesized by RAFT Dispersion Polymerization in Water." Polymer Chemistry 3.2 : 504-513.
Moxon, Samuel Robert, (2016) "Development of Biopolymer Hydrogels as Complex Tissue ENgineering Scaffolds" Doctoral thesis, University of Huddersfield. 211 pages.
Muth, JT, et al. Embedded 3D Printing of Strain Sensors within Highly Stretchable Elastomers; 2014, 26, pp. 6307-6312, Advanced Materials; www.advmat.de.
Office Action received in Japanese Patent Application No. 2017-530102 dated Oct. 29, 2019. [English translation provided].
Pairam, E., H. Le,; et al (2014) "Stability of Toroidal Droplets Inside Yield Stress Materials." Physical Review E 90.2 : 021002.
Pairam, Ekapop, et al. (2013) "Stable Nematic Droplets with Handles." Proceedings of the National Academy of Sciences 110.23 : 9295-9300.
Pfister, Andreas, et al. (2004) "Biofunctional Rapid Prototyping for Tissue-Engineering Applications: 3D Bioplotting Versus 3D Printing." Journal of Polymer Science Part A: Polymer Chemistry 42.3 : 624-638.
Rieger, J. (1996) "The Glass Transition Temperature of Polystyrene." Journal of thermal analysis 46.3-4 : 965-972.
Roberts, Geraint P., ; et al (2001) "New Measurements of the Flow-Curves for Carbopol Dispersions Without Slip Artefacts." Rheologica Acta 40.5 : 499-503.
Rudert, et al. (2009) "Experimental and numerical investigation of a viscoplastic Carbopol gel injected into a prototype 3D mold cavity," J Non-Newtonian Fluid Mechanics, , vol. 161, pp. 60-68.
Schaefermeier PK, et al. Design and fabrication of three-dimensional scaffolds for tissue engineering of human heart valves. Eur Surg Res. 2009 42(1):49-53.
Search Report issued in EP Patent Application 16793291, dated Feb. 5, 2019.
Wu, Kun-Ta, et al. (2017) "Transition From Turbulent to Coherent Flows in Confined Three-Dimensional Active Fluids." Science 355.6331 : eaal1979.
Office Action received in Japanese Patent Application No. 2017-557950 dated Jan. 7, 2020. [English translation provided].
Rudert, et al. "Experimental and numerical investigation of a viscoplastic Carbopol gel injected into a prototype 3D mold cavity," J Non-Newtonian Fluid Mechanics, 2009, vol. 161, pp. 60-68.
Khalil, et al. "Multi-nozzle deposition for construction of 3D biopolymer tissue scaffolds," Rapid Prototyping Journal, 2005, vol. 11/1, pp. 9-17.
Conrad, J. C. and Lewis, J. A. 'Structure of Colloidal Gels During Microchannel Flow'. Langmuir, Jun. 27, 2008, 24 (15), pp. 7628-7634.
Hardin, J.O., Ober, T.J., Valentine, A.D., Lewis, J.A. 'Microfluidic Printheads for Multimaterial 3D Printing of Viscoelastic Inks'. Advanced Materials, vol. 27, Issue 21, Jun. 3, 2015, pp. 3279-3284.
Smith, D.,'Multi-Material Breakthrough for 3D Printing' [Press Release] The Technology Partnership, Sep. 4, 2013.
The Diamond Hotend [Product] RepRap.me: http:/reprap.me/front-page-show/diamond-hotend.html.
The Technology Partnership. [Relevant Business; Melbourn, UK] http://www.ttp.com/printing.
Tumbleston, J.R., et al. 'Continuous Liquid Interface Production of 3D Objects'. Science, vol. 347, Issue 6228, Mar. 23, 2015, pp. 1349-1352.
Murphy, S.V., Atala, A. '3D Bioprinting of Tissues and Organs'. Nature Biotechnology, vol. 32, No. 8, Aug. 2014, pp. 773-785.
Derby, B. 'Printing and Prototyping of Tissues and Scaffolds'. Science, vol. 338, No. 6109, Nov. 2012, pp. 921-926.
Hinton, et al. "Three-dimensional printing of complex biological structures by freeform reversible embedding of suspended hydrogels," Sci. Adv. 1:e1500758.
Hinton, et al. "3D Printing PDMS Elastomer in Hydrophilic Support Bath via Freeform Reversible Embedding." ACS Biomater. Sci. Eng., May 4, 2016 (web).
International Search Report for PCT/US2016/050175 dated Nov. 22, 2016.

\* cited by examiner

VALVE INCORPORATING TEMPORARY PHASE CHANGE MATERIAL

CROSS-REFERENCE TO RELATED APPLICATIONS

This application is a continuation of copending application Ser. No. 15/757,122, filed Mar. 2, 2018, which is a National Stage of International Application No. PCT/US2016/050175, filed Sep. 2, 2016, which claims benefit of U.S. Provisional Patent Application Ser. No. 62/214,170, filed on Sep. 3, 2015, the entire contents of which are incorporated herein by reference.

BACKGROUND

Valves may be used to limit the flow of a material along a passage, including to stop the flow of a material along a passage. Valves may be used with various types of materials, including liquids, gases, and solids that may flow such as granular solids.

SUMMARY

In one embodiment, there is provided an apparatus comprising a granular gel that is a thixotropic material, a passage, and a pump to selectively draw the granular gel into the passage or push the granular gel out of the passage to use the granular gel as a valve, wherein the pump applies a pressure to the granular gel above a yield stress of the granular gel to cause a phase change in the granular gel when the granular gel is to be drawn into the passage or pushed out of the passage.

In another embodiment, there is provided an apparatus comprising a chamber, a plurality of first ports opening into the chamber, a plurality of first pumps, each first pump of the plurality of first pumps corresponding to a first port of the plurality of first ports, a second port opening into the chamber, a second pump to dispense a granular gel that is a thixotropic material into the chamber via the second port, and a controller configured to control the plurality of first pumps to selectively block or open each first port of the plurality of first ports using the granular gel, wherein to close a selected port of the plurality of first ports, the controller operates the second pump to dispense the granular gel into the chamber, operates a corresponding pump of the plurality of first pumps corresponding to the selected port to apply a first pressure above a yield stress of the granular gel to cause a phase change in the granular gel and draw the granular gel into the port, and operate the corresponding pump to apply a second pressure to the selected port below the yield stress of the granular gel to cause a phase change in the granular gel after the granular gel is disposed in the selected port.

In a further embodiment, there is provided a method of selectively blocking or opening a passage using a granular gel that is a thixotropic material, the method comprising blocking the passage using the granular gel, wherein the blocking comprises operating at least one pump to dispense the granular gel into the passage by applying a first pressure to the granular gel that is above a yield stress of the granular gel and causes a phase change in the granular gel, and after the granular gel is in the passage, operating the at least one pump to impose a second pressure on the passage that is below the yield stress of the granular gel and causes a phase change in the granular gel.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
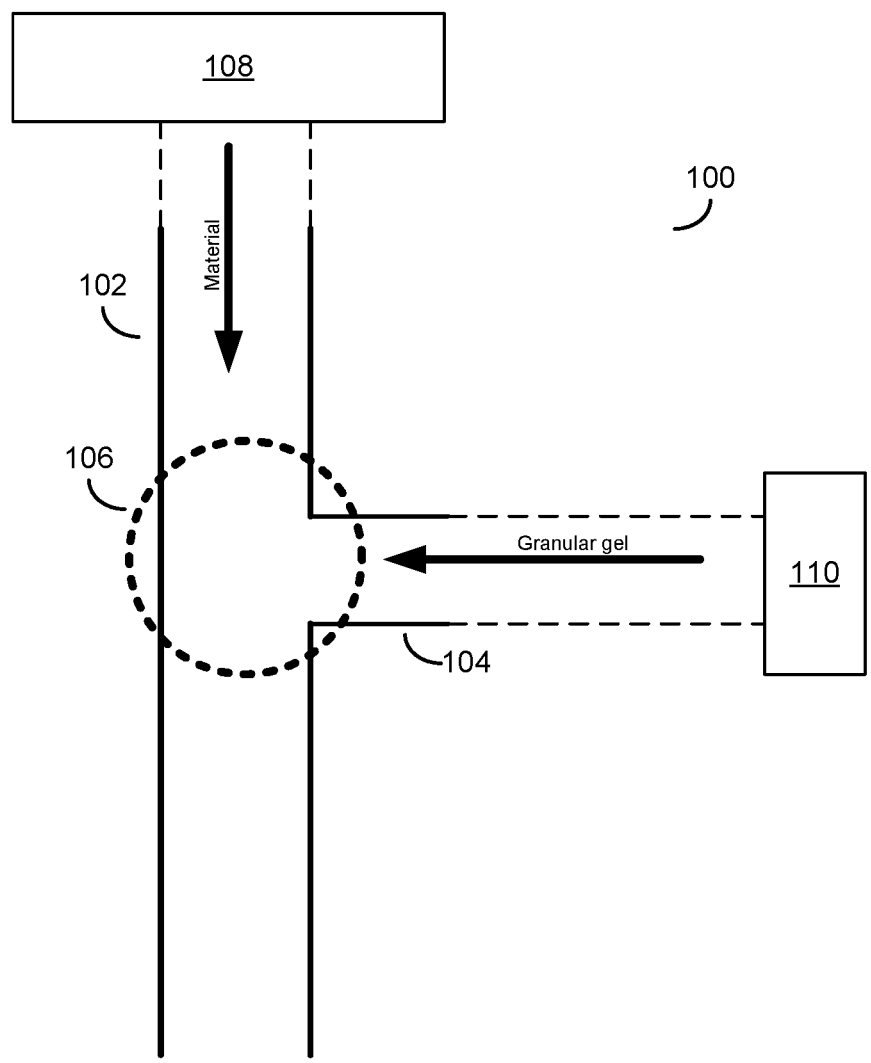
FIG. 1 is a schematic diagram of an example of a valve in accordance with some embodiments.

Described herein are various embodiments of a valve that may be opened and closed using a thixotropic or "stress yield" material, or other material that temporarily changes phase upon application of energy to the material. Some embodiments may include a valve that is opened and closed using a granular gel that is a temporary phase change material.

Embodiments are not limited to operating with any particular type of valve. Examples are described below of valves that selectively operate to block or permit, or limit, flow of a material along a passage, such as a pipe, tube, channel, or other conduit. The material that is blocked or permitted to flow may be a liquid, a fluid or viscous material, a gas, a granular solid or other solid that may be conveyed along a passage, or any other material.

The inventors have recognized and appreciated that some embodiments of valves operating with temporary phase change materials may have various advantages over other types of valves. For example, some valves operating with temporary phase change materials may be produced with smaller dimensions than may be achieved with other types of valves. As another example, some types of valves operating with temporary phase change materials may be less expensive to produce than other types of valves.

In some embodiments, the valve may be used with an apparatus for dispensing a pharmaceutical, such as dispensing a pharmaceutical into cells or tissues, such as dispensing in vivo or in vitro. For example, the valve may be used with a system for selectively delivering a pharmaceutical into an organism. As another example, the valve may be used with a print head, such as a print head for dispensing one or more materials such as inks, biological material such as cells, pharmaceuticals, compounds, or other materials. In embodiments in which the valve is used in a print head, the print head may include multiple valves, which are individually and selectively opened and closed using techniques described herein. Each of the valves may be connected to a source of a different material to be dispensed, such as a different pharmaceutical, a different ink, or other material.

Valves operating in accordance with techniques described herein may be incorporated into any of various devices, and may be operated by any suitable device. For example, a valve in accordance with techniques described herein may be integrated with a microelectromechanical system (MEMS) or a microfluidic device.

Embodiments may operate with a temporary phase change material that is a granular gel. A granular gel may include granular particles. The granular particles may be larger than 1 micron and not colloidal, and may be particles that do not or are arranged such that they do not translocate due to thermal forces. The granular gel may be a cross-linked polymer network that is solvated in a solvent. The solvent may be aqueous or another solvent. Examples of granular gels with which embodiments may operate include Carbopol ETC 2020 and Dow-Corning 9041 Silicon Elastomer Blend (dimethicone and dimethicone crosspolymer), both of which are commercially-available materials.

Other examples of silicone elastomer dispersions that may be used as the granular gel in some embodiments may include dimethicone/vinyl dimethicone crosspolymer blends from Dow Corning Corporation (Midland, Michigan) under trade name Dow Corning® 9040 silicone elastomer (cyclopentasiloxane and dimethicone crosspolymer), EL-9140DM (dimethicone and dimethicone crosspolymer); SFE 839, a cyclopentasiloxane (and) dimethicone/vinyl dimethicone crosspolymer from Momentive Performance Materials Inc. (Waterford, New York); cyclopentasiloxane (and) cetearyl dimethicone/vinyl dimethicone crosspolymer from Momentive Performance Materials Inc. under the tradename Silsoft*Silicone Gel; KSG-15 (cyclopentasiloxane and dimethicone/vinyl dimethicone crosspolymer), KSG-16 (dimethicone and dimethicone/vinyl dimethicone crosspolymer), KSG-18 (phenyl trimethicone and dimethicone/phenyl vinyl dimethicone crosspolymer), and KSG-41 (mineral oil and vinyl dimethicone/lauryl dimethicone crosspolymer) from Shin Etsu Silicones (Akron, Ohio).

It may be desirable in some scenarios, such as with some valves, to adjust a yield stress based on dimensions or geometries of the valves, to ensure that the yield stress is such that the valve may be blocked or opened as desired. The yield stress of temporary phase change materials, including granular gels, may be adjusted by controlling a concentration of a material within the temporary phase change materials. For example, the yield stress of Carbopol may be controlled by adjusting water content and the yield stress of DC-9041 may be controlled by adjusting PDMS oil content.

Embodiments may advantageously operate with valves of certain sizes. For example, a valve may not be smaller than a dimension of particles included in a granular gel. Thus, when operating with granular gels having particles larger than 1 micron, the valve may not be smaller than 1 micron. The valve may also not be so large that an amount of temporary phase change material to block the valve would be such that a force imposed on the temporary phase change material by its own mass will cause a phase change in the material. The inventors have recognized and appreciated that valves described herein may advantageously have an interior dimension between 1 micrometer and 1 centimeter, or between 10 micrometers and 10 millimeters, or between 20-25 micrometers and 10 millimeters, or between 20-25 micrometers and 100 micrometers. Those skilled in the art will appreciate from this disclosure that a geometry of a passage that is to be selectively blocked using the valve, and the dimensions of particles included in the granular gel that is used with the valve, may influence the workable dimensions of the valve. Valves of certain dimensions (e.g., at lower ends of ranges discussed previously, or at higher ends of ranges discussed previously) may operate better with passages having certain geometries, and valves operating with granular gels including particles of certain sizes may operate better with passages having certain geometries.

FIG. 1 illustrates an example of an assembly 100 including a valve in accordance with some embodiments. The assembly 100 includes a passage 102 that is to be selectively blocked or opened to permit a material to pass, and a second passage 104 through which a granular gel that is a temporary phase change material passes. The granular gel may be provided to an area 106 of the passage 102 to form a block in the passage 102. The assembly 100 may further include equipment 108, 110, either or both of which may apply a pressure to the passages 102, 104 and/or the area 106 to open or close the area 106 and thereby operate the valve. One or both of the equipment 108, 110 may be a pump, such as a peristaltic pump. Equipment 108, for example, may be equipment to provide the material along the passage 102, such as a pump to push the material into and along the passage 102, and thus may perform a function separate from driving the valve. Equipment 110 may be equipment to provide the granular gel along the passage 104 and, in some embodiments, may only operate as part of operating the valve, though in other embodiments may provide the granular gel for other reasons.

To operate the valve, the equipment 108 may back-pressurize the passage 102, exerting a force to pull materials vertically upward in the orientation of FIG. 1. Additionally or alternatively, the equipment 110 may push granular material along the passage 104, such as exerting a force to push the granular gel left-ward along the passage 104 in the orientation of FIG. 1. The granular gel is such that the force exerted by equipment 108 and/or equipment 110 is above the yield stress of the granular gel, which causes a phase change in the granular gel and causes the granular gel to flow into the area 106. After a time sufficient for the granular gel to flow into the area 106, or when the granular gel is detected in the area 106, or in response to another condition, the force is removed from the area 106 or otherwise dropped to a level below a yield stress of the granular gel, such as by ceasing operation of the equipment 108 and/or equipment 110. Once the force in the area 106 is below the yield stress of the granular gel, the granular gel may undergo a phase change and solidify or become more solid in the area 106, plugging the passage 102 and closing the valve.

Subsequently, the equipment 108 and/or equipment 110 may be operated to impose a force on the granular gel in the area 106, to cause another phase change in the granular gel and to cause the granular gel to exit the area 106. For example, the equipment 108 may exert a force to drive materials along the passage 102 vertically downward in the orientation of FIG. 1, and this force may drive the granular gel along the passage 102 following the phase change. In some embodiments, in addition, the equipment 110 may exert a force along the passage 104, such as to exert a force driving materials left-ward in the orientation of FIG. 1, to further induce force on the area 106 and cause a phase change in the granular gel, making the granular gel into a liquid or making it more liquid. Alternatively, the equipment 108 may not operate and the equipment 110 may exert a force to draw materials right-ward in the orientation of FIG. 1, to cause a phase change in the granular gel and draw the granular gel from the area 106 into the passage 104.

In some embodiments, operation of a valve like the valve of FIG. 1 may generate some amount of waste. For example, for the valve to operate properly in some embodiments, the area 106 should be free of other materials at the time the area 106 is to be filled with the granular gel to close the valve. Clearing the area 106 may include operating the equipment 108 and/or equipment 110 to push any materials in the area 106 out and, for example, into a waste receptacle. Similarly, when the valve is closed and is to be opened, the granular gel in the area 106 may be pushed out and into such a waste receptacle. In some embodiments, though, the granular gel may be compatible with a material that is to be distributed along the passage 102 or may not be dangerous or undesirable to administer to a destination of the passage 102. For example, in some cases the passage 102 may connect to an organism and the granular gel may be biodegradable and otherwise not harmful to the organism, in which case the granular gel, when cleared from the area 106 as part of opening the valve, may simply be passed along the passage 102 into the organism.

Figure 2:
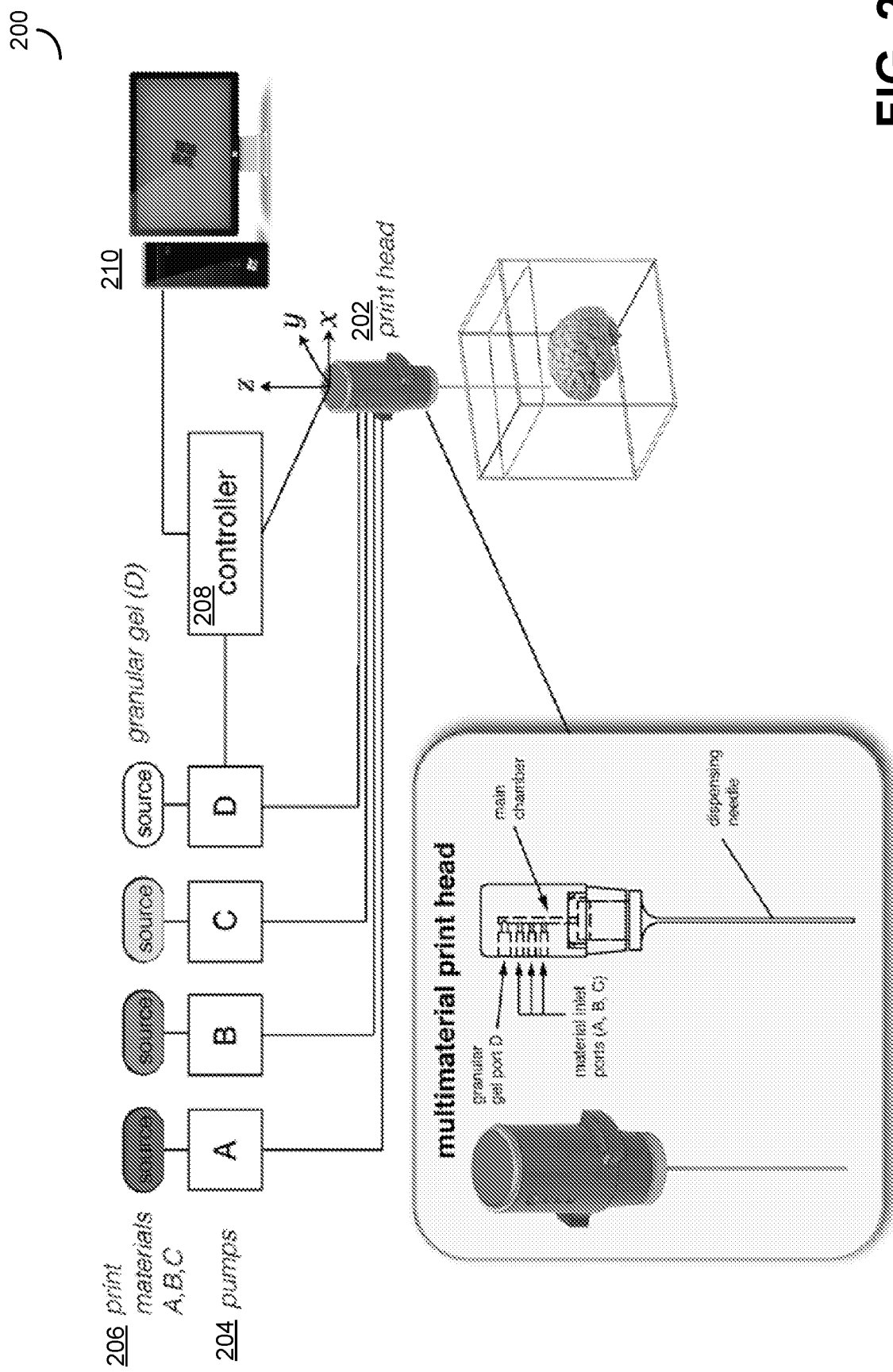
FIG. 2 is an illustration of a system with which some embodiments may operate.
Figure 3B:
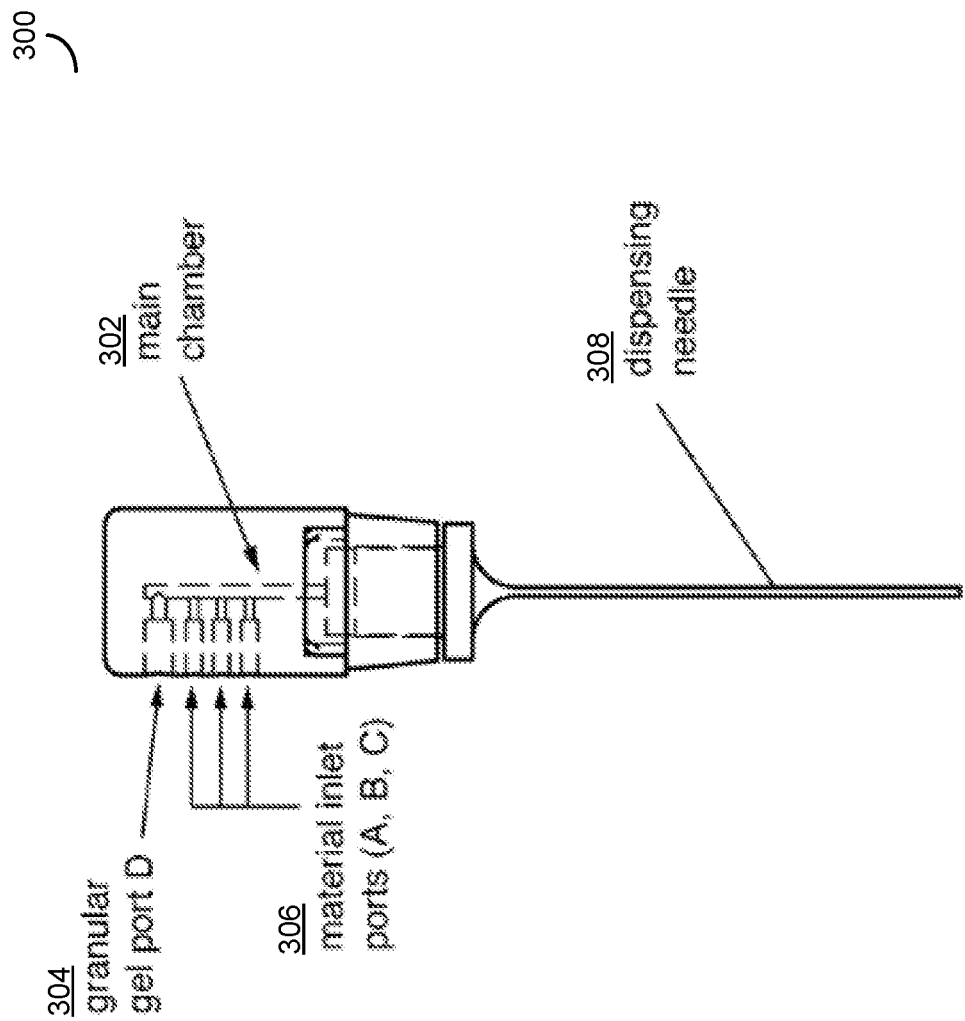
FIGS. 3A and 3B illustrate an example of a multi-valve print head with which some embodiments may operate.

FIGS. 2-3B illustrate another example of a valve in accordance with some embodiments. In particular, FIGS. 2-3B illustrate an example of a multi-valve dispenser and a system for operating the multi-valve dispenser. The multi-valve dispenser may dispense any suitable materials, as embodiments are not limited in this respect. In some embodiments, for example, the multi-valve dispenser may dispense, from each valve, a different material. The different materials may include inks, pharmaceuticals, compounds, biological materials (e.g., cells) or any other material that may be dispensed.

Figure 3A:
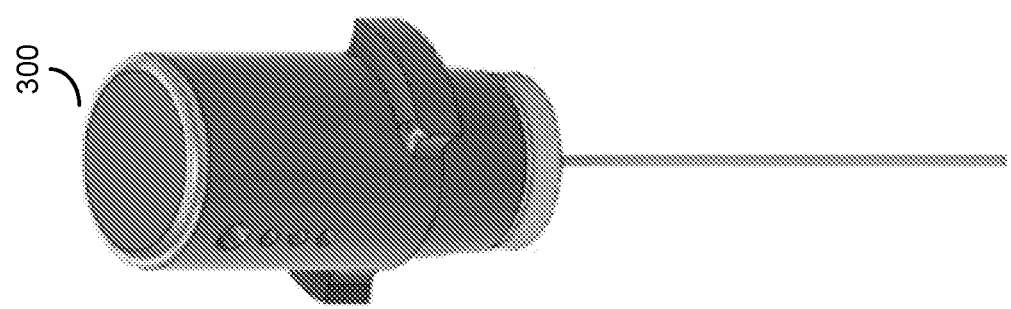

FIG. 2 illustrates an example of a system 200 for controlling a multi-valve dispenser 202, which in the example of FIG. 2 is a multi-valve print head. FIGS. 3A and 3B illustrate some components of an example of a print head 202 with which the system 200, or other systems, may operate. The print head 202 of system 200 includes multiple valves, each of which is connected to a different pump 204 and a different source 206 of material to be dispensed. The sources 206 includes three different sources 206 of print materials A, B, and C, as well as a source 206 of granular gel D.

The pumps 204 may be any suitable pumps, including peristaltic pumps, as embodiments are not limited in this respect. The pumps 204 may be operated to dispense materials A-D "forward" from the sources 206 toward the print head 202 along connecting passages, or may be operated to impose a "backward" pressure on the passages to pull materials along the passages from the print head 202 toward the pumps 204.

As should be appreciated from the foregoing discussion of valves, the valves of the print head 202 may be operated by dispensing a granular gel into the print head 202, through operation of the pump 204D that dispenses granular gel D, and by selectively operating pumps 204A-C to pull the dispensed granular gel D into a valve to be closed. More details regarding this operation are provided below in connection with FIG. 3D and FIG. 4.

System 200 further includes a controller 208 to operate the pumps 204, sources 206, and print head 202. The controller 208 may be operated or programmed to operate by a computing device 210.

System 200 may include equipment to move print head 202 in two or three dimensions and/or to rotate the print head 202 in one or more axes, to enable the print head 202 to dispense one or more materials at different locations.

The material(s) to be dispensed by the print head 202 may include any suitable materials. In some embodiments, the materials may be used for 3D printing, such as 3D printing in a container of a thixotropic material (e.g., granular gel D or another thixotropic material). The materials to be 3D printed may include biological cells, to form a 3D cell culture within the thixotropic material. The material(s) may be miscible or immiscible with the granular gel D or with the thixotropic material into which the material(s) are to be dispensed.

FIGS. 3A and 3B illustrate examples of a print head of some embodiments.

FIG. 3A illustrates an example of an exterior of the print head 300 of the example.

FIG. 3B illustrates examples of interior components of the print head 300. The print head 300 includes a main chamber 302 into which material is inserted via a granular gel port 304 and material inlet ports 306A-C. Material that is dispensed into the main chamber 302 (e.g., granular gel or materials A-C) may be dispensed via a dispensing needle 308.

Figure 4:
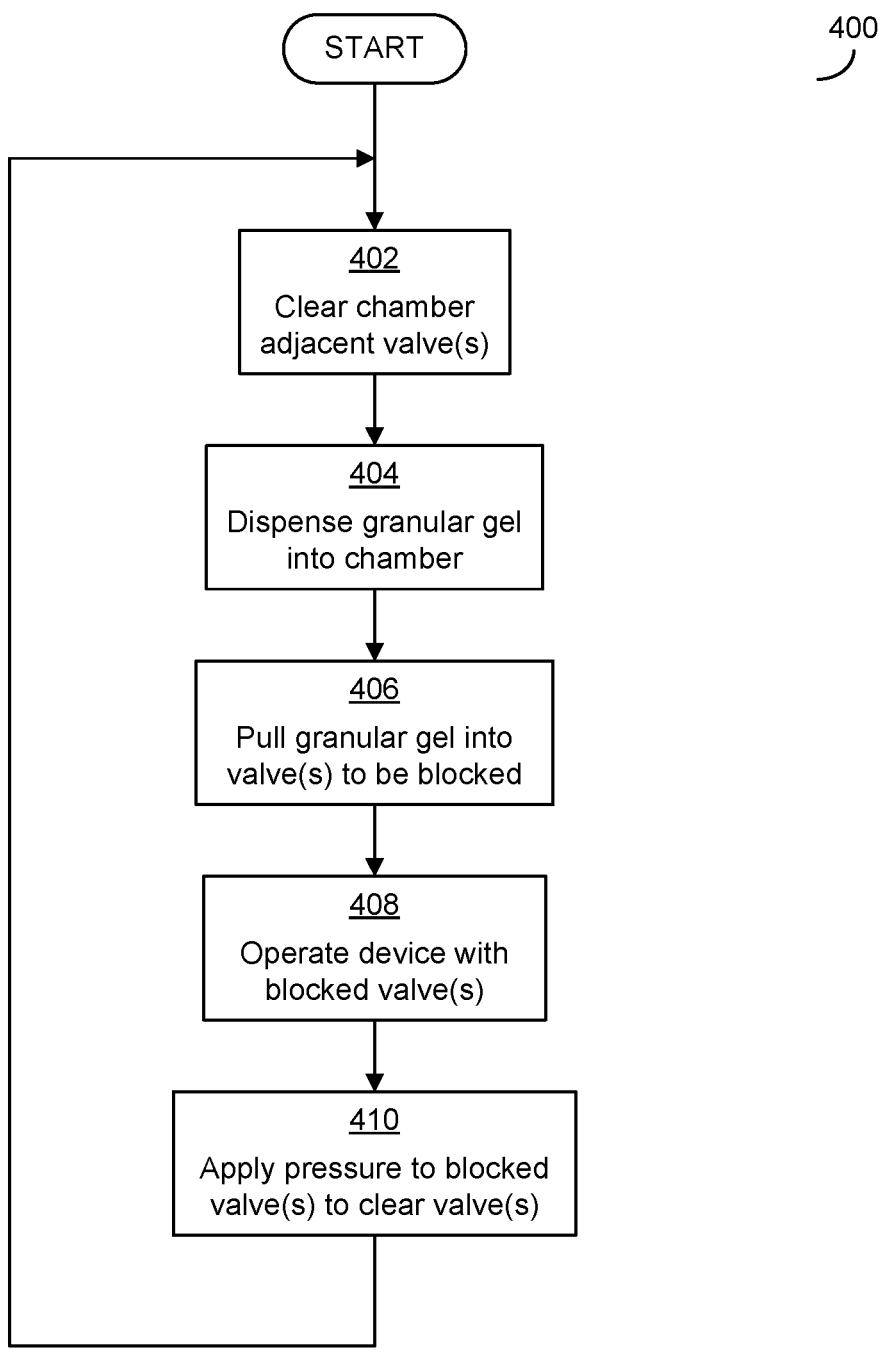
FIG. 4 is a flowchart of a method that may be performed by a controller for controlling operation of a valve in accordance with some embodiments.

Operation of the print head 300 and, in particular, usage of the granular gel D as a valve to selectively close ports 306A-C, is described in connection with process 400 of FIG. 4. Process 400 may be implemented by a valve control facility, which may be an application specific integrated circuit (ASIC) or other hardware, or executable instructions executing on one or more processors. For example, the valve control facility may form at least a part of the controller 208 of FIG. 2.

As part of normal operation of the print head, one or more of materials A-C, along or together with granular gel D, may be inserted into main chamber 302 and dispensed via the dispensing needle 308. During operation of the print head 300, it may be advantageous to occasionally close one or more of ports 306A-C, to prevent material from being dispensed via the closed port(s). Valves as described herein may be used to close the port(s) 306A-C. The process 400 of FIG. 4 begins when a port is to be closed.

To close a port, in block 402 the main chamber 302 is emptied by dispensing material therein out of the dispensing needle 308, such as into a waste receptacle. The main chamber 302 may be cleared in any suitable manner. In some embodiments, as part of clearing the main chamber 302, the valve control facility in block 404 operating a pump (not shown in FIG. 3B; see FIG. 2 for an example) connected to port 304 to dispense sufficient granular gel via port 304 to ensure that material in the main chamber 302 is pushed out of the dispensing needle 308 and the main chamber 302 is filled with only granular gel. In other embodiments, the main chamber 302 may be cleared in another manner in block 402 and, following the clearing, the granular gel D may be dispensed into the main chamber in block 404.

When granular gel is filling the main chamber 302 in this manner, material may not be dispensed via the material ports 306A-C, such as by the valve control facility ceasing operation of pumps (not shown in FIG. 3B; see FIG. 2 for examples) respectively connected to ports 306A-C.

Once main chamber 302 is filled with granular gel, or during the filling of the main chamber 302 with the granular gel, the valve control facility instructs the pumps connected to the port(s) of ports 306A-C that are to be closed back-pressurize a passage connected to the port(s) to draw granular gel from the main chamber 302 into the ports. The pressure applied by the pumps to draw the granular gel into the port(s) to be blocked may be a pressure about a yield stress of the granular gel, to cause the granular gel to phase change to a more liquid state (or prevent a phase change to a more solid state) and flow into the port(s) to be blocked. Once the granular gel is drawn into the port(s), or once sufficient time has passed that granular gel has likely been drawn into the port(s), the pump(s) that were back-pressurizing the port(s) to be closed are shut off. Once the pump(s) are no longer applying a pressure to the granular gel, the granular gel undergoes a phase change and solidifies in the port(s) to be closed. In this manner, the granular gel may be used as a valve to selectively close ports 306A-C of print head 300.

In block 408, the print head 302 is operated while one or more of the ports 306A-C are blocked, including to dispense material from one or more of the ports 306A-C that are not blocked.

To open a closed port 306A-C, in block 410 the valve control facility instructs a corresponding pump for the port to be opened may be turned on to forward-pressurize the passage connected to the port and push the granular gel and a material A-C out of the port and into the main chamber 302. The forward pressure on the granular gel triggers a phase change in the granular gel, causing it to change from a solid to a fluid and flowing from the port 306A-C to the main chamber 302.

Once the material is in the main chamber 302, the valve control facility may control operation of the print head 302 to dispense material in the print head 302 into, for example, a waste receptacle.

Once the valve is cleared, the process 400 loops back to block 402 to selectively block one or more ports.

Valve control techniques operating according to the principles described herein may be implemented in any suitable manner. Included in the discussion above is a flow chart showing the steps and acts of various processes that control operation of a valve using a temporary phase change material. The processing and decision blocks of the flow chart above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow chart included herein does not depict the syntax or operation of any particular circuit or of any particular programming language or type of programming language. Rather, the flow chart illustrates the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in the flow chart is merely illustrative of the algorithms that may be implemented and can be varied in implementations and embodiments of the principles described herein.

In some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 506 of FIG. 5 described below (i.e., as a portion of a computing device 500) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 2, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 5:
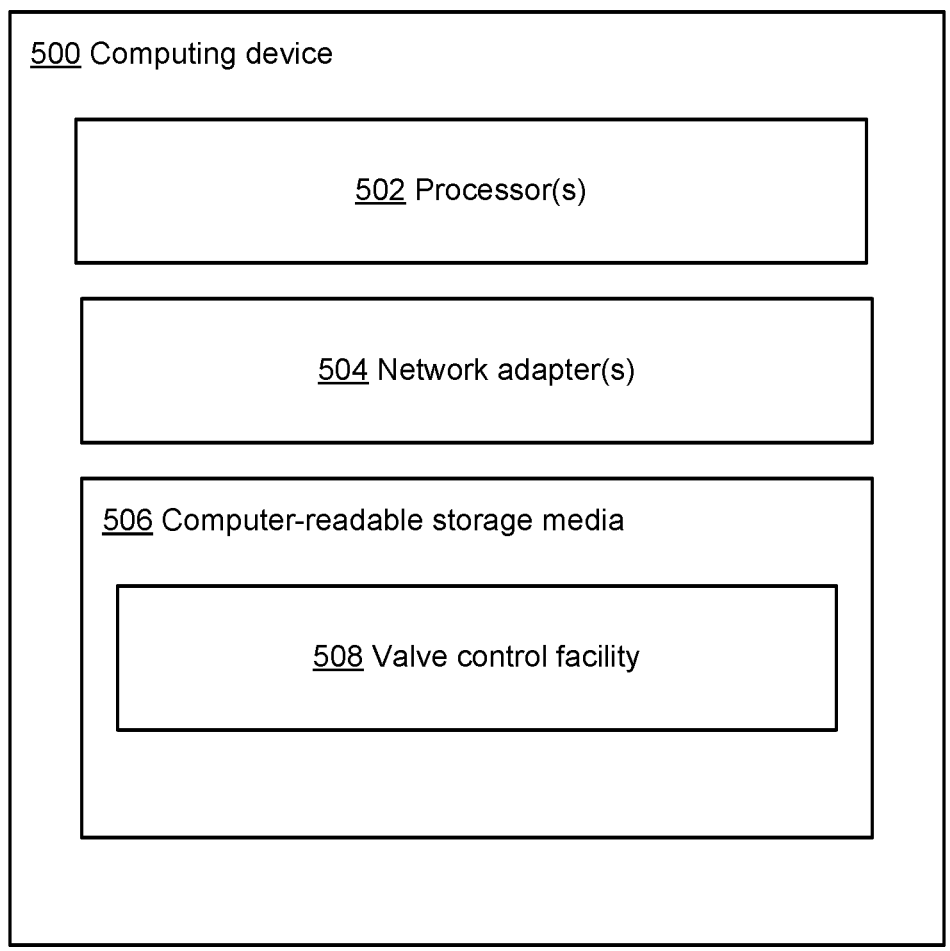
FIG. 5 is a block diagram of a computing device with which some embodiments may operate.

FIG. 5 illustrates one exemplary implementation of a computing device in the form of a computing device 500 that may be used in a system implementing techniques described herein, although others are possible. It should be appreciated that FIG. 5 is intended neither to be a depiction of necessary components for a computing device to operate in accordance with the principles described herein, nor a comprehensive depiction.

Computing device 500 may comprise at least one processor 502, a network adapter 504, and computer-readable storage media 506. Computing device 500 may be, for example, a desktop or laptop personal computer, a device customized to perform control of a print head or valve, or any other suitable computing device. Network adapter 504 may be any suitable hardware and/or software to enable the computing device 500 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 506 may be adapted to store data to be processed and/or instructions to be executed by processor 502. Processor 502 enables processing of data and execution of instructions. The data and instructions may be stored on the computer-readable storage media 506.

The data and instructions stored on computer-readable storage media 506 may comprise computer-executable instructions implementing techniques which operate according to the principles described herein. In the example of FIG. 5, computer-readable storage media 506 stores computer-executable instructions implementing various facilities and storing various information as described above. Computer-readable storage media 506 may store a valve control facility 508.

While not illustrated in FIG. 5, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A system comprising:
    an apparatus, wherein the apparatus comprises a material source connected to a chamber by a valve and a first pump connected with the valve;
    a controller operably connected to the first pump; and
    a granular gel disposed in the chamber fluidly connected to the valve that is a thixotropic material;
    wherein the granular gel comprises a cross-linked polymer network that is solvated in a solvent, wherein the controller is configured to control the first pump to selectively block or open the valve with the granular gel, wherein to block the valve the controller operates the first pump to apply a first pressure above a yield stress of the granular gel to cause a phase change in the granular gel from a solid to a liquid and draw the granular gel into the passage, and after the granular gel is in the valve, operating the first pump to impose a second pressure on the granular gel that is below the yield stress of the granular gel and causing a second phase change in the granular gel from a liquid to a solid, thereby blocking the valve, wherein to open the valve the controller operates the first pump to apply a third pressure above the yield stress of the granular gel to cause a third phase change in the granular gel from a solid to a liquid and to draw the granular gel out of the valve, thereby opening the valve.

2. The system of claim 1, further comprising a second pump configured to convey the material through the valve and into the chamber.

3. The system of claim 2, further comprising a granular gel chamber connected to the first pump configured to dispense the granular gel into the valve.

4. The system of claim 3, further comprising a plurality of material sources, valves, and second pumps, wherein the controller selectively operates each of the plurality of pumps to selectively block or open plurality of valves using the granular gel to selectively dispense a material source from the plurality of material sources.

5. The system of claim 1, wherein the granular gel comprises granular particles larger than 1 micron that are not colloidal.

6. The system of claim 1, further comprising a dispensing needle in fluidic communication with the chamber.

7. The system of claim 1, wherein the granular gel comprises high molecular weight crosslinked polyacrylic acid polymers or a silicone elastomer dispersion.

\* \* \* \* \*